March 19, 1935.  R. S. SANFORD ET AL  1,994,835
GEAR SHIFTING MECHANISM
Original Filed Dec. 11, 1931  2 Sheets-Sheet 1
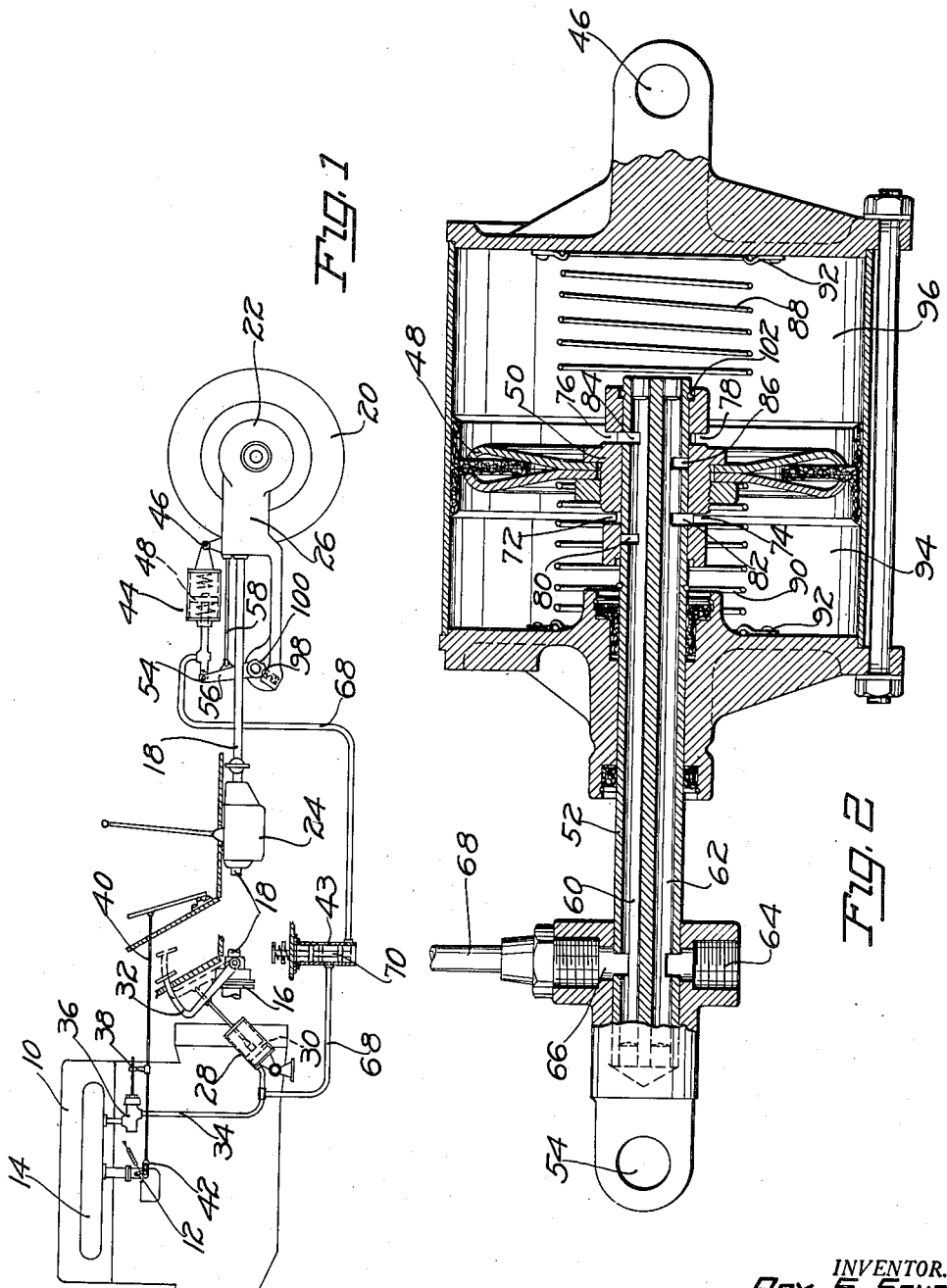
INVENTOR.
ROY S. SANFORD
ROBERT P. BREESE
BY
ATTORNEY March 19, 1935. R. S. SANFORD ET AL 1,994,835
GEAR SHIFTING MECHANISM
Original Filed Dec. 11, 1931  2 Sheets-Sheet 2
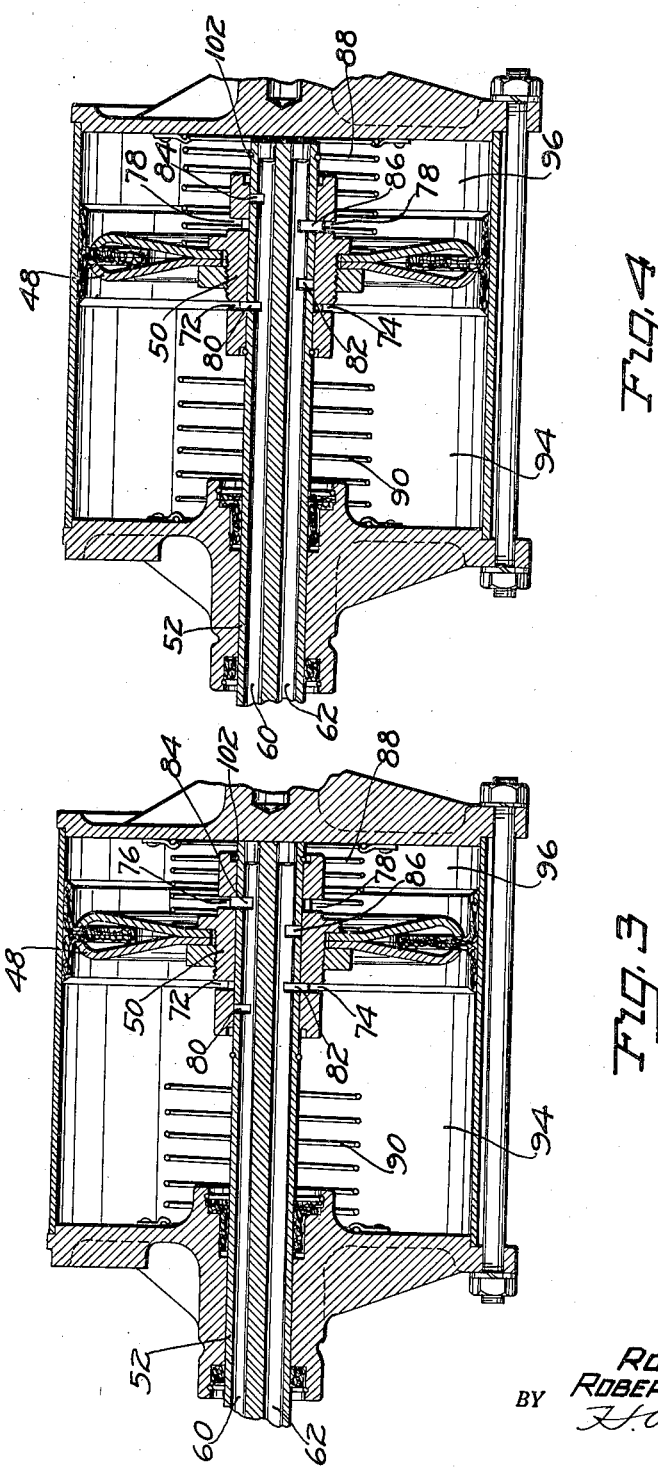
INVENTOR.
ROY S. SANFORD
ROBERT P. BREESE
BY
ATTORNEY Patented Mar. 19, 1935

1,994,835

UNITED STATES PATENT OFFICE 1,994,835

GEAR SHIFTING MECHANISM

Roy S. Sanford, New York, N. Y., and Robert P. Breese, South Bend, Ind., assignors to Bendix Aviation Corporation, South Bend, Ind., a corporation of Delaware Application December 11, 1931, Serial No. 580,446
Renewed January 29, 1934

8 Claims. (Cl. 121—38)

This invention, in its broadest aspect, relates to new and useful improvements in the power plant of an automotive vehicle.

More specifically, the invention relates to gear shifting mechanism and is of particular utility when employed in connection with speed-changing and direction-reversing gearing commonly used in coupling internal-combustion engines of automobiles with the driving vehicle wheels or other propelling devices.

One object of the invention is to provide power operated means for operating a two-speed transmission mechanism, preferably mounted on the differential housing of an automotive vehicle. Such a mechanism is designed to supplement the conventional change-speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

According to one desirable construction, there is suggested a vacuum operated double-acting servomotor mechanism controlled by a manually operated three-way valve. The motor comprises a double-ended casing housing a unit comprising a piston and a relatively movable connecting rod, and which unit serves both as a selector valve to determine the mode of operation of the motor and as the force-transmitting reciprocable element of the motor.

Other objects of the invention and desirable details of construction and combinations of parts will become apparent from a detailed description of certain embodiments of the invention, described in detail in the following specification taken in conjunction with the accompanying drawings illustrating said embodiments, in which:

Figure 1 is a diagrammatic view disclosing the various elements of the power plant constituting the present invention; and Figures 2, 3 and 4 disclose various longitudinal sectional views of the transmission operating servomotor, said motor constituting the essence of the instant invention.

In that embodiment of the invention selected for illustration and shown diagrammatically in Figure 1 there is provided a conventional internal-combustion engine 10 having a throttle 12 and intake manifold 14. A conventional disk clutch 16 comprising the usual driving and driven plates, or equivalent elements, serves to connect the engine with a drive shaft 18, the latter being connected to the rear or drive wheels 20 through the intermediary of a conventional differential 22. A conventional three-speeds forward and reverse transmission or equivalent change-speed mechanism 24 is incorporated in the driven mechanism, and supplementing the transmission 24, and also incorporated in the driven mechanism, there is provided a two-speed transmission mechanism 26, preferably mounted on the differential housing as disclosed diagrammatically in Figure 1.

Power means are provided for operating the clutch comprising a vacuum operated servomotor, the latter comprising a cylinder 28 secured to the chassis and a reciprocable piston 30 operably connected to a conventional clutch pedal 32. A fluid transmitting conduit 34 interconnects the manifold 14 with the servomotor, a three-way valve 36, described in detail in an application of Victor W. Kliesrath, No. 568,082, filed October 10, 1931, being interposed in the fluid transmitting connection to control the motor in its operation of the clutch. The valve 36 is operated either before or after the throttle is opened or closed respectively by a connection 38 interconnecting the valve and throttle rod 40. A lost motion connection 42 is provided between the throttle 12 and rod 40 to effect this operation.

With the opening of the valve upon completely releasing the accelerator pedal the clutch operating motor is energized or vacuum operated in a manner well-known in the art to thereby disengage the clutch and upon closing the valve, with actuation of the accelerator pedal, the motor is deenergized and the clutch permitted to engage. At closed throttle the engine cylinders function as a pump to evacuate the manifold, producing a vacuum of approximately twenty inches of mercury.

The aforementioned structure is described only briefly, inasmuch as the same forms no part of the instant invention, being disclosed in part in the patent to Belcia, No. 1,470,272, dated October 9, 1923, and disclosed and claimed in greater detail in the application of Victor W. Kliesrath and Roy S. Sanford, No. 580,434, filed December 11, 1931.

The invention is particularly concerned with the means for operating the two-speed supplemental transmission 26 mounted on the differential housing. Such means, in brief, comprises a vacuum operated servomotor controlled by a manually operated spring loaded three-way valve 43, the latter being preferably rigidly secured to the under side of the floor board in a position to be operated by the left foot of the driver.

Describing the aforementioned motor in greater detail, the same comprises a double-ended cylinder 44 pivotally secured to the transmission 26 at 46. A piston 48 is reciprocable within the cylinder, the hub 50 of which is slidably mounted on a piston rod 52, the latter being pivotally connected at 54 to a crank arm or lever member 56 operably connected, by rod 58, to actuate the supplemental transmission 26. The relatively movable ported piston hub 50 and rod 52 together constitute a selector valve to determine the mode of operation of the motor, as will be described in greater detail hereinafter. The rod 52 is provided with two separate bores 60 and 62, the latter being vented to the atmosphere at 64 and the former connected by a port 66 with a flexible air transmitting conduit 68, preferably connected at its other end to the conduit 34 intermediate the valve 36 and clutch operating motor. The spring pressed three-way valve 43 is incorporated in the fluid circuit provided by conduit 68, the reciprocable spool-shaped piston 70 of which serves to alternately intercommunicate the bore 60 with the atmosphere or with the manifold, depending upon the position of the piston.

The piston hub 50 is provided with slots 72 and 74 to the left of the piston 48 and with slots 76 and 78 to the right of the piston, certain of which slots are adapted to register with certain of slots 80 and 82, 84 and 86 in the rod 52. The motor structure also includes valve operating springs 88 and 90 secured to the inner faces of the ends of the motor by fastenings 92.

The complete cycle of operations will now be described starting with the vehicle at rest and the engine inoperative.

Upon starting the engine with the accelerator released the vacuum induced in the manifold will at once energize the clutch operating motor to disengage the clutch, the piston 30 of the motor and its connected clutch pedal 32 moving to the positions shown in Figure 1. The control valve 36, at this time, is opened to interconnect the manifold with the clutch motor. The other control valve 43 is, at this time, closed, that is positioned to vent the bore 60 to atmosphere, and the piston 48 is positioned intermediate the ends of the motor, as disclosed in Figure 2, registering ports 74 and 82 and also registering ports 76 and 84. The left compartment 94 of the motor is thus vented to atmosphere via port 64, bore 62 and ports 74 and 82. The right compartment 96 is likewise vented via valve 43, port 66, bore 60 and registered ports 76 and 84. The crank 56 is at this time positioned as disclosed in Figure 1 to place the transmission 26 in one of its two gear settings, preferably the higher of the two; such setting is maintained by a spring pressed ball 98 adapted to seat within detents 100 in the hub of the lever 56.

Assuming that it is now desired to start the car in motion, the transmission 24 is placed in low gear and the accelerator subsequently depressed to open the throttle. The initial movement of the accelerator pedal serves to close the valve 36, deenergizing the clutch motor and permitting the clutch to engage. Further depression of the accelerator serves to speed up the engine to effect the desired vehicle speed in low gear. Subsequent operation of the accelerator to clutch and declutch accompanied by the successive shifting into second and high gears will effect the desired speed of the vehicle in the usual manner.

Should it be desired to change the driving ratio, assuming a fixed gear setting of the conventional transmission 24, it is merely necessary to declutch by releasing the accelerator and then open the valve 43 with the toe of the left foot. The right compartment 96 of the transmission operating motor is thus placed in communication with the manifold via ports 76 and 84, bore 60, conduit 68, valve 43, conduit 34 and valve 36, the latter being opened upon release of the accelerator. The piston 48 is thus forced to the right, to the position disclosed in Figure 3, by virtue of the evacuation of the right compartment 96 of the motor and the weight of the atmosphere acting on the left side of the piston 48. This piston movement also serves to compress spring 88 for a purpose to be described hereinafter.

The piston hub 50 during this movement abuts a stop 102 at the end of the rod 52 to thereby actuate the rod and its connected crank 56 to change the setting of the transmission 26. Preferably the above shift is effected while the car is free wheeling in conventional high gear, thereby stepping down the driving ratio between the engine and the rear wheels and permitting a very quick pick-up in traffic. In order to obtain this pick-up it is, of course, necessary to again depress the accelerator to engage the clutch and speed up the engine. Obviously, however, the driving ratio might be changed by the operation of the supplemental transmission in any one of the remaining gear settings of the transmission 24.

The transmission control valve may now be closed by lifting the left toe to thereby actuate the selector valve mechanism heretofore referred to and prepare the motor for its next gear shifting operation. This is accomplished by the return movement of the valve piston 70 to the full line position disclosed in Figure 1, thus venting the right compartment 96 of the motor to atmosphere via the bore 60 and registered ports 76 and 84. The compressed spring 88 then expands to move the piston 48 to the left relative to the rod 52, to the position disclosed in Figure 4, registering ports 78 and 86 and ports 72 and 80.

The piston 48 and rod 52 together constitute the aforementioned selector valve. The valve is furthermore power operated by springs 88 and 90, and which power operation is controlled by the control valve 43, the latter thereby serving the dual function of a control valve for the motor and as a control valve for the power means for actuating the selector valve mechanism. It is also to be noted that the piston and connecting rod of the motor effect the dual function of serving as the reciprocating element of the motor in operating the supplemental transmission, and also serving as the selector valve mechanism.

Now when it is desired to step up the driving ratio, or rather return it to its original setting, the aforementioned cycle of operations is repeated, the piston 48 now moving to the left under the weight of the atmosphere acting on its right side. Upon closing or venting of the control valve 43 the selector valve mechanism is again power or spring operated to prepare for the subsequent gear shifting operation of the motor to follow.

It will be noted that the aforementioned motor may not be operated to actuate the transmission 26 until the three-way clutch control valve 36 is opened. Such structure thus insures a disengagement of the clutch prior to the power operation of the transmission 26, which is the end desired. It is also to be noted that the accelerator serves the threefold function of controlling the throttle, the clutch and the supplemental transmission.

There is thus provided a very simple and compact power operated transmission operating mechanism including a power operated selector valve, said mechanism cooperating with a power operated clutch and providing, in conjunction with the conventional transmission, eight different driving ratios to thereby insure the much desired flexibility of control in the operation of the vehicle.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. A vacuum operated servomotor mechanism comprising a double-ended casing member, relatively movable piston and connecting rod members, each provided with ports, said members functioning as a valve by virtue of the registering of said ports one with another, said members adapted to reciprocate as a unit within said casing during the power operation of the motor, valve means for controlling the power operation of the servomotor, and means mounted at each end of the casing for imparting said relative movement between said rod and piston to provide a reversal of movement of the unit in effecting its power loading function.

2. A vacuum operated servomotor mechanism comprising a double-ended casing member, relatively movable piston and connecting rod members functioning as a valve by virtue of said movement, said members provided with intercommunicating slots to effect said valve function and adapted to reciprocate as a unit within said casing during the power operation of the motor, valve means for controlling the power operation of the servomotor and a compressible spring mounted at each end of the casing for imparting said relative movement between said rod and piston to provide the desired valve action to effect a reversal of movement of the unit in its power loading function.

3. A fluid operated servomotor mechanism comprising, in combination, a control valve for said mechanism, a double-ended casing, a connecting rod slidably mounted for reciprocable movement through one end wall of said casing, said rod being provided with parallel air transmitting bores, a piston member slidably mounted on one end of said rod, said piston and rod being provided with openings, certain of said openings adapted to register one with another depending upon the relative positions of the rod and piston, and means at each end of the casing for imparting relative movement between said rod and piston.

4. A fluid operated servomotor mechanism comprising, in combination, a control valve for said mechanism, a double-ended casing, a connecting rod slidably mounted for reciprocable movement through one end wall of said casing, said rod being provided with parallel air transmitting bores, a piston member slidably mounted on one end of said rod, said piston and rod being provided with slots, certain of said slots adapted to register one with another depending upon the relative positions of the rod and piston, and spring means at each end of the casing for imparting relative movement between said rod and piston.

5. Power means for operating a change-speed transmission comprising a fluid operated motor, comprising a casing member, a control valve for said motor, relatively movable piston and connecting rod elements operatively reciprocable as a unit within said casing member, each of said elements being provided with intercommunicating ports to selectively control the direction of movement of the unit, the relative position of said elements to effect said control being determined in part by yieldable means interposed between the ends of the casing and said piston.

6. A vacuum operated double-acting servomotor comprising a double-ended casing member, a reciprocable connecting rod slidably mounted in one end of said casing, said rod being provided with parallel bores, one adapted to be alternately connected with a source of vacuum and with the atmosphere and the other communicating at all times with the atmosphere, a reciprocable piston member slidably mounted on said rod, said piston being provided with a hub portion having spaced slots, said rod being also provided with spaced slots, certain of said slots in the piston hub and in the rod registering, with the piston in its initial position, to intercommunicate the aforementioned atmospheric bore with the left side of the motor and also intercommunicating the aforementioned vacuum bore with the right side of the motor, and means, at each end of the casing, for imparting relative movement to the piston and rod after a power stroke of the piston has been completed and after the vacuum bore has been placed in communication with the atmosphere, to thereby prepare the piston and rod for a subsequent power stroke in the reverse direction.

7. A vacuum operated servomechanism comprising a motor unit including a double-ended casing member, valve means for controlling the influx and efflux of a power fluid to and from said casing, a combined power and selector valve unit mounted for reciprocable movement within said casing, and means within said casing for operating said unit as a selector valve.

8. A double-acting vacuum operated servomechanism comprising a motor unit including a double-ended casing member, valve means for controlling the influx and efflux of a power fluid to and from said casing, a combined power and selector valve unit mounted for reciprocable movement within said casing, said unit comprising members relatively movable with respect to each other, and means within said casing for operating said unit as a selector valve, said means being under the control of said aforementioned valve means.

ROY S. SANFORD.
ROBERT P. BREESE.